US006235821B1

(12) United States Patent
Saito

(10) Patent No.: US 6,235,821 B1
(45) Date of Patent: May 22, 2001

(54) CLEANSING THERMOPLASTIC RESIN COMPOSITION

(75) Inventor: Takanori Saito, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/402,250

(22) PCT Filed: Apr. 1, 1998

(86) PCT No.: PCT/JP98/01509

§ 371 Date: Dec. 8, 1999

§ 102(e) Date: Dec. 8, 1999

(87) PCT Pub. No.: WO98/44048

PCT Pub. Date: Oct. 8, 1998

(30) Foreign Application Priority Data

Feb. 4, 1997 (JP) .................................................. 9-099807

(51) Int. Cl.[7] .............................. C08K 5/42; C08L 33/12
(52) U.S. Cl. ........................ 524/161; 524/515; 524/523; 525/330.3
(58) Field of Search .................................... 524/161, 523, 524/525, 528, 513, 515; 525/190, 195, 330.3

(56) References Cited

U.S. PATENT DOCUMENTS

| 3,909,478 | * | 9/1975 | Riess et al. . | |
|---|---|---|---|---|
| 4,377,664 | | 3/1983 | Bourland . | |
| 4,692,295 | * | 9/1987 | Vinatier . | |
| 4,713,310 | * | 12/1987 | Horie . | |
| 4,940,747 | * | 7/1990 | Eichenauer et al. | 524/526 |
| 5,447,989 | * | 9/1995 | Mylonakis et al. | 525/67 |
| 5,696,187 | * | 12/1997 | Kokuzawa et al. | 524/161 |
| 5,717,021 | * | 2/1998 | Huang et al. | 524/525 |

FOREIGN PATENT DOCUMENTS

| 0234529 | * | 9/1987 | (EP) . |
|---|---|---|---|
| 0 432 585 A2 | | 6/1991 | (EP) . |
| 0010937 | * | 4/1973 | (JP) . |
| 5-98072 | | 4/1993 | (JP) . |
| 5-98298 | | 4/1993 | (JP) . |

* cited by examiner

Primary Examiner—Tae H. Yoon
(74) Attorney, Agent, or Firm—Leydig, Voit & Mayer, Ltd

(57) ABSTRACT

The invention provides thermoplastic resin compositions for purging which comprise a thermoplastic resin and a methyl methacrylate/styrene copolymer incorporated therein. According to the invention, thermoplastic resin compositions for purging molding machines, which have an excellent cleaning ability, can be obtained.

2 Claims, No Drawings

CLEANSING THERMOPLASTIC RESIN COMPOSITION

TECHNICAL FIELD

The present invention relates to purging thermoplastic resin compositions for use in the purging of molding machines for thermoplastic resins. More particularly, this invention relates to a thermoplastic resin composition for purging which comprises a thermoplastic resin and a methyl methacrylate/styrene copolymer and a thermoplastic resin composition for purging which comprises a thermoplastic resin, a methyl methacrylate/styrene copolymer, and a metal salt of an alkylbenzenesulfonic acid.

BACKGROUND ART

In the molding of plastics, change of a resin being used has conventionally necessitated various means for eliminating the influences of the preceding resin. Especially in the molding of colored resins, when the resin to be molded is changed from one of a dark color, e.g., blue or black, to one of a light color, e.g., white, a complicated cleaning operation has been necessary which comprises, for example, disassembling and cleaning the molding machine or purging the molding machine with a general or reclaimed resin or the like and is accompanied by a prolonged suspension of production. As a means for eliminating these problems, various thermoplastic resin compositions for purging molding machines have been developed.

For example, Unexamined Published Japanese Patent Application No. 62-195045 proposes a composition obtained by incorporating a sodium alkylbenzenesulfonate and a water-repellent compound (a metal salt of a higher fatty acid, wax, liquid paraffin, synthetic wax, etc.) into a thermoplastic resin in respective amounts of from 2 to 30% by weight and from 0.5 to 10% by weight based on the composition; Unexamined Published Japanese Patent Application No. 05-060768 proposes a composition obtained by incorporating the calcium salt of a boric ester of a higher fatty acid monoglyceride and an inorganic filler into a thermoplastic resin; and Unexamined Published Japanese Patent Application No. 03-283805 proposes a purging composition obtained by incorporating a neutral salt of an alkylbenzenesulfonic acid and basic magnesium stearate into a thermoplastic resin in respective amounts of from 2 to 40% by weight and from 1 to 10% by weight based on the composition.

However, the conventional purging compositions described above are still insufficient in cleaning ability, and there is a desire for a thermoplastic resin composition for purging which has a high cleaning ability.

As apparent from the above description, an object of the present invention is to provide a thermoplastic resin composition for purging a molding machine, which has an excellent cleaning ability.

DISCLOSURE OF THE INVENTION

The present inventor made extensive studies in order to develop a purging resin composition having an excellent cleaning ability. As a result, it has been found that a composition comprising a thermoplastic resin and a methyl methacrylate/styrene copolymer contained therein and a composition comprising the above composition and further a metal salt of an alkylbenzenesulfonic acid contained therein are purging thermoplastic resin compositions having an excellent cleaning ability. The present invention has been completed based on this finding.

The present invention has the following constitutions.

(1) A thermoplastic resin composition for purging, which comprises a thermoplastic resin and a methyl methacrylate/styrene copolymer contained in the thermoplastic resin.

(2) The thermoplastic resin composition for purging as described in the above (1), wherein the methyl methacrylate/styrene copolymer is contained in an amount of from 1 to 30% by weight based on the composition.

(3) The thermoplastic resin composition for purging as described in the above (1), wherein the thermoplastic resin further contains the methyl methacrylate/styrene copolymer and a metal salt of an alkylbenzenesulfonic acid.

(4) The thermoplastic resin composition for purging as described in the above (3), wherein the methyl methacrylate/styrene copolymer and the metal salt of an alkylbenzenesulfonic acid are contained in amounts of from 0.5 to 10% by weight and from 1 to 30% by weight, respectively, based on the composition.

(5) The thermoplastic resin composition for purging as described in any one of the above (1) to (4), wherein the methyl methacrylate/styrene copolymer has a number-average molecular weight of from 10,000 to 150,000.

(6) The thermoplastic resin composition for purging as described in the above (3) or (4), wherein the alkyl group in the metal salt of an alkylbenzenesulfonic acid has from 6 to 20 carbon atoms and the metal salt is a salt of sodium, calcium, magnesium or potassium.

(7) The thermoplastic resin composition for purging as described in any one of the above (1) to (4), wherein the thermoplastic resin comprises at least one compound selected from polypropylene, high-density polyethylene, low-density polyethylene, linear low-density polyethylene, poly(ethylene terephthalate), poly(butylene terephthalate), polystyrene, acrylonitrile/butadiene/styrene copolymers, acrylonitrile/styrene copolymers, and poly(methyl methacrylate).

BEST MODES FOR CARRYING OUT THE INVENTION

The thermoplastic resin for use in the present invention means a resin which is capable of repeatedly undergoing a cycle in which the resin, upon heating, softens and fluidizes with increasing temperature and, upon cooling, comes into a relatively rigid state having a strength. The thermoplastic resin is not particularly limited as long as it has the above property. However, from the standpoint of obtaining a purging thermoplastic resin composition which has a satisfactory cleaning ability, in particular, which is less apt to remain in the molding machine or extruder and is capable of shortening the time period required for purging, it is preferred to use one or more thermoplastic resins selected from polypropylene, high-density polyethylene, low-density polyethylene, linear low-density polyethylene, poly(ethylene terephthalate), poly(butylene terephthalate), polystyrene, acrylonitrile/butadiene/styrene copolymers, acrylonitrile/styrene copolymers, and poly(methyl methacrylate). These thermoplastic resins may be used alone or as a mixture of two or more thereof. These resins are not limited to fresh ones, and may be reclaimed ones for recycling which have been obtained by recovering used resins and pulverizing the same.

The methyl methacrylate/styrene copolymer for use in the present invention is not particularly limited as long as it is a polymer obtained by copolymerizing methyl methacrylate and styrene. However, from the standpoint of attaining an excellent cleaning ability, the copolymer has a number-average molecular weight of preferably from 10,000 to 150,000, more preferably from 30,000 to 100,000, especially preferably from 50,000 to 80,000.

From the standpoints of cleaning ability and the replaceability of the composition itself with a succeeding resin, methacrylic acid and styrene are copolymerized in such a ratio that the proportion of methyl methacrylate is preferably from 5 to 50% by weight, more preferably from 10 to 40% by weight, especially preferably from 15 to 30% by weight.

The methyl methacrylate/styrene copolymer for use in the present invention can be obtained by a known process, e.g., the suspension polymerization method or emulsion polymerization method. The suspension polymerization method, for example, comprises introducing pure water, styrene monomer, methyl methacrylate monomer, poly(vinyl alcohol) as a dispersant, and lauroyl peroxide as a polymerization initiator into a vessel equipped with a stirrer and heating the resultant mixture to 70 to 80° C. with stirring to copolymerize the monomers. The copolymer slurry obtained is dehydrated with a centrifugal separator and dried in an air stream, whereby the target copolymer can be obtained as a powder. Commercially available products can also be used. Examples thereof include New Frontier MS-750P (manufactured by Dai-ichi Kogyo Seiyaku Co., Ltd.).

The metal salt of an alkylbenzenesulfonic acid for use in the present invention may be an industrially produced one in which the alkyl group has preferably 6 to 20 carbon atoms, more preferably 8 to 17 carbon atoms, especially preferably 10 to 14 carbon atoms, and the metal salt is preferably a salt of sodium, calcium, magnesium or potassium, especially preferably a salt of sodium or magnesium.

In the thermoplastic resin composition for purging of the present invention which comprises a thermoplastic resin and a methyl methacrylate/styrene copolymer, the content of the methyl methacrylate/styrene copolymer is not particularly limited. However, in order to enable the composition to have an excellent cleaning ability, the amount of the methyl methacrylate/styrene copolymer incorporated in the thermoplastic resin is preferably from 1 to 30% by weight, more preferably from 3 to 20% by weight, especially preferably from 5 to 15% by weight, based on the composition.

In the thermoplastic resin composition for purging of the present invention which comprises a thermoplastic resin, a methyl methacrylate/styrene copolymer, and a metal salt of an alkylbenzenesulfonic acid, the content of the methyl methacrylate/styrene copolymer is not particularly limited. However, in order to enable the composition to have an excellent cleaning ability, the content thereof is preferably from 0.5 to 10% by weight, more preferably from 1 to 6% by weight, especially preferably from 1.5 to 4% by weight, based on the composition. The content of the metal salt of an alkylbenzenesulfonic acid in the composition is also not particularly limited. However, in order to enable the composition to have an excellent cleaning ability, the content thereof is preferably from 1 to 30% by weight, more preferably from 3 to 20% by weight, especially preferably from 5 to 10% by weight, based on the composition.

An inorganic filler such as, e.g., calcium carbonate, basic magnesium carbonate, basic magnesium stearate, talc, silica, alumina, or glass fibers can be added to the compositions of the present invention if desired and necessary. It is also possible to add a metal soap such as, e.g., calcium stearate, magnesium stearate, or zinc stearate or a wax such as, e.g., carnauba wax or polyethylene wax.

The compositions of the present invention can be obtained by mixing a thermoplastic resin and a methyl methacrylate/styrene copolymer in respective desired amounts or mixing these ingredients and a metal salt of an alkylbenzenesulfonic acid in respective desired amounts by means of a stirring mixer. The compositions can be obtained also by melt-kneading the resultant mixture at a melt-kneading temperature of from 180 to 300° C. and extruding the melt into pellets. The stirring mixer may be an ordinarily used one such as, e.g., a Henschel mixer (trade name), supermixer, tumbling mixer, or ribbon blender. An extruder such as, e.g., a single-screw extruder, twin-screw extruder, or co-kneader may be used.

EXAMPLES

The present invention will be explained below in detail by reference to Examples and Comparative Examples, but the invention should not be construed as being limited thereto. In the Examples and Comparative Examples, cleaning ability was evaluated through the following purging test (1) or (2).

Purging Test (1):

A flame-retardant polypropylene composition (property: black) composed of: 84 wt % of polypropylene having a melt flow rate (JIS K7210: 230° C., 21.18 N load; hereinafter abbreviated as "MFR (1)") of 6.0 g/10 min and a crystal melting point of 165° C.; 10 wt % of bist{[3,5-dibromo-4-(2',3'-dibromopropoxy)]phenyl}sulfone; 5 wt % of antimony trioxide; and 1 wt % of carbon black was extruded for about 60 minutes with a single-screw extruder (cylinder diameter: 35 mm, L/D: 30) at a rotational screw speed of 150 rpm, a discharge rate of 5 kg/h, and an extrusion temperature of 200° C. A thermoplastic resin composition for purging (property: milk-white or light yellow) was fed in place of the flame-retardant polypropylene composition to the extruder in which the flame-retardant polypropylene composition still remained. The purging thermoplastic resin composition was extruded and the amount thereof required for the black color of the flame-retardant polypropylene composition to disappear was measured. Subsequently, polypropylene having an MFR (1) of 6.0 g/10 min and a crystal melting point of 165° C. was fed as a succeeding resin for purging in place of the purging thermoplastic resin composition. The purging polypropylene as a succeeding resin was extruded and the amount thereof required for the color of the purging thermoplastic resin composition to disappear was measured. Furthermore, the time period required from initiation of the extrusion of the purging thermoplastic resin composition to disappearance of the color of the purging thermoplastic resin composition was measured.

The above amounts and period were used as measures of cleaning ability.

Purging Test (2):

A flame-retardant ABS resin composition (property: black) composed of: 84 wt % of ABS resin having a specific gravity of 1.05 and a melt flow rate (JIS K7210: 220° C., 98.07 N load; hereinafter abbreviated as "MFR (2)") of 9 g/10 min (trade name, ABS 45; manufactured by Japan Synthetic Rubber Co., Ltd.); 10 wt % of 2,2-bis{[3,5-dibromo-4-(2',3'-dibromopropoxy)]phenyl}propane; 5 wt % of antimony trioxide; and 1 wt % of carbon black was extruded for about 60 minutes with a single-screw extruder (cylinder diameter: 35 mm, L/D: 30) at a rotational screw speed of 150 rpm, a discharge rate of 5 kg/h, and an extrusion temperature of 220° C. Subsequently, a thermoplastic resin composition for purging (property: milk-white or light yellow) was fed in place of the flame-retardant ABS resin composition to the extruder (in which the flame-retardant ABS resin composition still remained). The purging thermoplastic resin composition was extruded and the amount thereof required for the black color of the flame-retardant ABS resin composition to disappear was measured. Subsequently, an ABS resin (property: light yellow) having a specific gravity of 1.05 and an MFR (2) of 9 g/10 min (trade name, ABS 45; manufactured by Japan Synthetic Rubber Co., Ltd.) was fed as a succeeding resin for purging in place of the purging thermoplastic resin composition. The purging ABS resin composition as a succeeding resin was extruded and the amount thereof required for the color of the purging thermoplastic resin composition to disappear was measured. Furthermore, the time period required from initiation of the extrusion of the purging thermoplastic resin composition to disappearance of the color of the purging thermoplastic resin composition was measured.

The above amounts and period were used as measures of cleaning ability.

Example 1

Into a Henschel mixer having a capacity of 20 liters were introduced 4.80 kg (96.0 wt %) of polypropylene having an MFR (1) of 0.5 g/10 min and a crystal melting point of 165° C. and 0.10 kg (4.0 wt %) of a methyl methacrylate/styrene copolymer having a number-average molecular weight of 67,000 and a methyl methacrylate/styrene copolymerization ratio of 25/75 in terms of wt % (trade name, New Frontier MS-750P; manufactured by Dai-ichi Kogyo Seiyaku Co., Ltd.; hereinafter abbreviated as MMSC). The contents were stirred and mixed for 3 minutes at a rotational speed of 500 rpm. The mixture obtained was fed to a twin-screw extruder (cylinder diameter, 30 mm; L/D, 30) and melt-kneaded and extruded at a cylinder temperature of 190 to 200° C. and a die temperature of 200° C. The extrudate was cooled in a water bath and cut with a pelletizer to obtain a thermoplastic resin composition for purging (property: milk-white). This thermoplastic resin composition for purging was used to conduct the purging test (1) described above. As a result, the required amount of the purging thermoplastic resin composition was 1.1 kg and that of the polypropylene as a succeeding resin for purging was 1.3 kg. The time period required was 29 minutes.

Example 2

A thermoplastic resin composition for purging (property: milk-white) was obtained in the same manner as in Example 1, except that 4.975 kg (99.5 wt %) of polypropylene having an MFR (1) of 0.5 g/10 min and a crystal melting point of 165° C. and 0.025 kg (0.5 wt %) of the MMSC were used. This thermoplastic resin composition for purging was used to conduct the purging test (1). As a result, the required amount of the purging thermoplastic resin composition was 2.3 kg and that of the polypropylene as a succeeding resin for purging was 1.7 kg. The time period required was 49 minutes.

Example 3

A thermoplastic resin composition for purging (property: milk-white) was obtained in the same manner as in Example 1, except that 4.45 kg (89.0 wt %) of high-density polyethylene having a melt flow rate (JIS K7210: 190° C., 21.18 N load; hereinafter abbreviated as MFR (3)) of 0.5 g/10 min and a density of 0.95 g/cm$^3$ and 0.55 kg (11 wt %) of the MMSC were used. This thermoplastic resin composition for purging was used to conduct the purging test (1). As a result, the required amount of the purging thermoplastic resin composition was 0.6 kg and that of the polypropylene as a succeeding resin for purging was 0.9 kg. The time period required was 18 minutes.

Example 4

A thermoplastic resin composition for purging (property: light yellow) was obtained in the same manner as in Example 1, except that 4.05 kg (81.0 wt %) of an ABS resin having a specific gravity of 1.03 and an MFR (2) of 0.4 g/10 min (PA-709, manufactured by Chimei Corporation) and 0.95 kg (19.0 wt %) of the MMSC were used. This thermoplastic resin composition for purging was used to conduct the purging test (2). As a result, the required amount of the purging thermoplastic resin composition was 0.6 kg and that of the ABS resin as a succeeding resin for purging was 1.5 kg. The time period required was 26 minutes.

Example 5

A thermoplastic resin composition for purging (property: light yellow) was obtained in the same manner as in Example 1, except that 3.35 kg (67 wt %) of an ABS resin having a specific gravity of 1.03 and an MFR (2) of 0.4 g/10 min (PA-709, manufactured by Chimei Corporation) and 1.65 kg (33 wt %) of the MMSC were used. This thermoplastic resin composition for purging was used to conduct the purging test (2). As a result, the required amount of the purging thermoplastic resin composition was 1.6 kg and that of the ABS resin as a succeeding resin for purging was 2.3 kg. The time period required was 47 minutes.

Example 6

A thermoplastic resin composition for purging (property: milk-white) was obtained in the same manner as in Example 1, except that 3.65 kg (73.0 wt %) of polystyrene having a melt flow rate (JIS K7210: 200° C., 49.03 N load; hereinafter abbreviated as MFR (4)) of 0.5 g/10 min and a density (specific gravity) of 1.05 and 1.35 kg (27.0 wt %) of the MMSC were used. This thermoplastic resin composition for purging was used to conduct the purging test (2). As a result, the required amount of the purging thermoplastic resin composition was 0.7 kg and that of the ABS resin as a succeeding resin for purging was 1.9 kg. The time period required was 32 minutes.

Example 7

A thermoplastic resin composition for purging (property: milk-white) was obtained in the same manner as in Example 1, except that 4.00 kg (80.0 wt %) of polypropylene having an MFR (1) of 0.5 g/10 min and a crystal melting point of 165° C., 0.50 kg (10.0 wt %) of the MMSC, and 0.50 kg (10.0 wt %) of sodium dodecylbenzenesulfonate were used. This thermoplastic resin composition for purging was used to conduct the purging test (1). As a result, the required amount of the purging thermoplastic resin composition was 1.0 kg and that of the polypropylene as a succeeding resin for purging was 1.4 kg. The time period required was 29 minutes.

Example 8

A thermoplastic resin composition for purging (property: milk-white) was obtained in the same manner as in Example 1, except that 4.965 kg (99.3 wt %) of polypropylene having an MFR (1) of 0.5 g/10 min and a crystal melting point of 165° C., 0.010 kg (0.2 wt %) of the MMSC, and 0.025 kg (0.5 wt %) of sodium dodecylbenzenesulfonate were used. This thermoplastic resin composition for purging was used to conduct the purging test (1). As a result, the required amount of the purging thermoplastic resin composition was 2.4 kg and that of the polypropylene as a succeeding resin for purging was 1.3 kg. The time period required was 45 minutes.

Example 9

A thermoplastic resin composition for purging (property: milk-white) was obtained in the same manner as in Example 1, except that 4.59 kg (91.8 wt %) of polypropylene having an MFR (1) of 0.5 g/10 min and a crystal melting point of 165° C., 0.01 kg (0.2 wt %) of the MMSC, and 0.40 kg (8.0 wt %) of sodium dodecylbenzenesulfonate were used. This thermoplastic resin composition for purging was used to conduct the purging test (1). As a result, the required amount of the purging thermoplastic resin composition was 1.7 kg and that of the polypropylene as a succeeding resin for purging was 1.5 kg. The time period required was 39 minutes.

Example 10

A thermoplastic resin composition for purging (property: milk-white) was obtained in the same manner as in Example 1, except that 4.00 kg (80.0 wt %) of high-density polyethylene having an MFR (3) of 0.5 g/10 min and a density of 0.95 g/cm$^3$, 0.25 kg (5.0 wt %) of the MMSC, and 0.75 kg (15.0 wt %) of sodium dodecylbenzenesulfonate were used. This thermoplastic resin composition for purging was used to conduct the purging test (1). As a result, the required amount of the purging thermoplastic resin composition was 0.6 kg and that of the polypropylene as a succeeding resin for purging was 0.9 kg. The time period required was 18 minutes.

Example 11

A thermoplastic resin composition for purging (property: light yellow) was obtained in the same manner as in Example 1, except that 4.65 kg (93.0 wt %) of an ABS resin having a specific gravity of 1.03 and an MFR (2) of 0.4 g/10 min (PA-709, manufactured by Chimei Corporation), 0.10 kg (2.0 wt %) of the MMSC, and 0.25 kg (5.0 wt %) of sodium dodecylbenzenesulfonate were used. This thermoplastic resin composition for purging was used to conduct the purging test (2). As a result, the required amount of the purging thermoplastic resin composition was 0.5 kg and that of the ABS resin as a succeeding resin for purging was 1.1 kg. The time period required was 20 minutes.

Example 12

A thermoplastic resin composition for purging (property: light yellow) was obtained in the same manner as in Example 1, except that 3.9 kg (78.0 wt %) of an ABS resin having a specific gravity of 1.03 and an MFR (2) of 0.4 g/10 min (PA-709, manufactured by Chimei Corporation), 0.6 kg (12.0 wt %) of the MMSC, and 0.5 kg (10.0 wt %) of sodium dodecylbenzenesulfonate were used. This thermoplastic resin composition for purging was used to conduct the purging test (2). As a result, the required amount of the purging thermoplastic resin composition was 1.2 kg and that of the ABS resin as a succeeding resin for purging was 2.2 kg. The time period required was 41 minutes.

Example 13

A thermoplastic resin composition for purging (property: light yellow) was obtained in the same manner as in Example 1, except that 2.75 kg (55.0 wt %) of an ABS resin having a specific gravity of 1.03 and an MFR (2) of 0.4 g/10 min (PA-709, manufactured by Chimei Corporation), 0.60 kg (12.0 wt %) of the MMSC, and 1.65 kg (33.0 wt %) of sodium dodecylbenzenesulfonate were used. This thermoplastic resin composition for purging was used to conduct the purging test (2). As a result, the required amount of the purging thermoplastic resin composition was 1.7 kg and that of the ABS resin as a succeeding resin for purging was 2.8 kg. The time period required was 55 minutes.

Example 14

A thermoplastic resin composition for purging (property: milk-white) was obtained in the same manner as in Example 1, except that 3.4 kg (68.0 wt %) of polystyrene having a melt flow rate (JIS K7210: 200° C., 49.03 N load; hereinafter abbreviated as MFR (4)) of 0.5 g/10 min and a density (specific gravity) of 1.05, 0.35 kg (7.0 wt %) of the MMSC, and 1.25 kg (25.0 wt %) of sodium dodecylbenzenesulfonate were used. This thermoplastic resin composition for purging was used to conduct the purging test (2). As a result, the required amount of the purging thermoplastic resin composition was 0.8 kg and that of the ABS resin as a succeeding resin for purging was 2.3 kg. The time period required was 38 minutes.

Example 15

A thermoplastic resin composition for purging (property: milk-white) was obtained in the same manner as in Example 1, except that 4.2 kg (84.0 wt %) of a powder obtained from colorless and transparent poly(ethylene terephthalate) bottles used once for drinking water by washing the bottles with water to remove foreign matters, pulverizing the washed bottles with a pulverizer to an average particle diameter of from 0.2 mm to 1.0 mm, and then vacuum-drying the particles at 80° C. for 2 hours, 0.4 kg (8.0 wt %) of the MMSC, and 0.4 kg (8.0 wt %) of sodium dodecylbenzenesulfonate. This thermoplastic resin composition for purging was used to conduct the purging test (2). As a result, the required amount of the purging thermoplastic resin composition was 0.6 kg and that of the ABS resin as a succeeding resin for purging was 2.7 kg. The time period required was 40 minutes.

Comparative Example 1

An ABS resin (property: light yellow) having a specific gravity of 1.05 and an MFR (2) of 9 g/10 min (trade name, ABS 45; manufactured by Japan Synthetic Rubber Co., Ltd.) was used as a thermoplastic resin composition for purging to conduct the purging test (2). As a result, the total amount of the ABS resin as a purging thermoplastic resin composition and the ABS resin as a succeeding resin for purging was 8.0 kg and the time period was 98 minutes.

Comparative Example 2

A thermoplastic resin composition for purging (property: milk-white) was obtained in the same manner as in Example 1, except that 4.6 kg (92.0 wt %) of polypropylene having an MFR (1) of 9 g/10 min and a crystal melting point of 165° C., 0.3 kg (6.0 wt %) of sodium dodecylbenzenesulfonate, and 0.1 kg (0.2 wt %) of polyethylene wax were used. This thermoplastic resin composition for purging was used to conduct the purging test (1). As a result, the required amount of the purging thermoplastic resin composition was 3.5 kg and that of the polypropylene as a succeeding resin for purging was 2.5 kg. The time period required was 74 minutes.

Comparative Example 3

A thermoplastic resin composition for purging (property: light yellow) was obtained in the same manner as in Example 1, except that 4.3 kg (86.0 wt %) of an ABS resin having a specific gravity of 1.03 and an MFR (2) of 0.4 g/10 min, 0.2 kg (4.0 wt %) of the calcium salt of a boric ester of stearic acid monoglyceride, and 0.5 kg (10.0 wt %) of calcium carbonate were used. This thermoplastic resin composition for purging was used to conduct the purging test (2). As a result, the required amount of the purging thermoplastic resin composition was 2.8 kg and that of the ABS resin as a succeeding resin for purging was 2.2 kg. The time period required was 61 minutes.

Comparative Example 4

A thermoplastic resin composition for purging (property: milk-white) was obtained through mixing and melting in the same manner as in Example 1, except that 3 kg (60 wt %) of a methyl methacrylate/styrene copolymer having a melt flow rate (JIS K7210: 200° C., 66.19 N load; hereinafter abbreviated as MFR (5)) of 1.5 g/10 min, a density of 1.09, and a number-average molecular weight of 250,000 (Estyrene MS-300, manufactured by Nippon Steel Chemical Co., Ltd.) and 2 kg (40 wt %) of sodium dodecylbenzenesulfonate were used. This thermoplastic resin composition for purging was used to conduct the purging test (2). As a result, the required amount of the purging thermoplastic resin composition was 3.1 kg and that of the ABS resin as a succeeding resin for purging was 2.8 kg. The time period required was 72 minutes.

| | | Example | | | | | | | | | |
|---|---|---|---|---|---|---|---|---|---|---|---|
| | | 1 | 2 | 3 | 4 | 5 | 6 | 7 | 8 | 9 | 10 |
| Component proportion in thermoplastic resin composition for purging | Polypropylene (%) | 96.0 | 99.5 | — | — | — | — | 80.0 | 99.3 | 91.8 | — |
| | High-density polyethylene (%) | — | — | 89.0 | — | — | — | — | — | — | 80.0 |
| | ABS resin (%) | — | — | — | 81.0 | 67.0 | — | — | — | — | — |
| | Polystyrene (%) | — | — | — | — | — | 73.0 | — | — | — | — |
| | Methyl methacrylate/styrene copolymer (%) | 4.0 | 0.5 | 11.0 | 19.0 | 33.0 | 27.0 | 10.0 | 0.2 | 0.2 | 5.0 |
| | Sodium dodecylbenzenesulfonate (%) | — | — | — | — | — | — | 10.0 | 0.5 | 8.0 | 15.0 |
| | Polyethylene wax (%) | — | — | — | — | — | — | — | — | — | — |
| | (Note 1) | — | — | — | — | — | — | — | — | — | — |
| | Calcium carbonate (%) | — | — | — | — | — | — | — | — | — | — |
| Purging test | Use amount of the thermoplastic resin composition for purging (kg) | 1.1 | 2.3 | 0.6 | 0.6 | 1.6 | 0.7 | 1.0 | 2.4 | 1.7 | 0.6 |
| | Use amount of polypropylene or ABS resin (kg) | 1.3 | 1.7 | 0.9 | 1.5 | 2.3 | 1.9 | 1.4 | 1.3 | 1.5 | 0.9 |
| | Purging period (min) | 29 | 49 | 18 | 26 | 47 | 32 | 29 | 45 | 39 | 18 |

(Note 1) Calcium salt of boric ester of stearic acid monoglyceride (%)

| | | Example | | | | | Comparative Example | | | |
|---|---|---|---|---|---|---|---|---|---|---|
| | | 11 | 12 | 13 | 14 | 15 | 1 | 2 | 3 | 4 |
| Component proportion in thermoplastic resin composition for purging | Polypropylene (%) | — | — | — | — | — | — | 92.0 | — | — |
| | High-density polyethylene (%) | — | — | — | — | — | — | — | — | — |
| | ABS resin (%) | 93.0 | 78.0 | 55.0 | — | — | 100 | — | 86.0 | — |
| | Polystyrene (%) | — | — | — | 68.0 | — | — | — | — | — |
| | Methyl methacrylate/styrene copolymer (%) | 2.0 | 12.0 | 12.0 | 7.0 | 8.0 | — | — | — | 60.0 |
| | Sodium dodecylbenzenesulfonate (%) | 5.0 | 10.0 | 33.0 | 25.0 | 8.0 | — | 6.0 | — | 40.0 |
| | Polyethylene wax (%) | — | — | — | — | — | — | 2.0 | — | — |
| | (Note 1) | — | — | — | — | — | — | — | 4.0 | — |
| | Calcium carbonate (%) | — | — | — | — | — | — | — | 10.0 | — |
| | Reclaimed poly(ethylene terephthalate) (%) | — | — | — | — | 84.0 | — | — | — | — |
| Purging test | Use amount of the thermoplastic resin composition for purging (kg) | 0.5 | 1.2 | 1.7 | 0.8 | 0.6 | — | 3.5 | 2.8 | 3.1 |
| | Use amount of polypropylene or ABS resin (kg) | 1.1 | 2.2 | 2.8 | 2.3 | 2.7 | 8.0 | 2.5 | 2.2 | 2.8 |
| | Purging period (min) | 20 | 41 | 55 | 38 | 40 | 98 | 74 | 61 | 72 |

(Note 1) Calcium salt of boric ester of stearic acid monoglyceride (%)

POSSIBILITY OF INDUSTRIAL APPLICATION

The thermoplastic resin compositions for purging according to the present invention each is a purging thermoplastic resin composition having an exceedingly high cleaning ability when used for the purging of an injection-molding machine or extruder in which a resin used for injection molding or extrusion molding is tenaciously adherent to the inside of the apparatus due to pyrolysis to make it difficult to clean the apparatus.

The thermoplastic resin compositions for purging according to the present invention, even when used in a small amount, are far more effective than conventional purging thermoplastic resin compositions in reducing the use amount of a succeeding resin for purging. The compositions of the present invention are also effective in reducing the purging period.

What is claimed is:

1. A purging thermoplastic resin composition which comprises a thermoplastic resin comprising at least one compound selected from the group consisting of polypropylene, high-density polyethylene, low-density polyethylene, linear low-density polyethylene, poly(ethylene terephthalate), poly(butylene terephthalate), polystyrene, acrylonitrile/butadiene/styrene copolymers, acrylonitrile/styrene copolymers and poly(methyl methacrylate);

- a methyl methacrylate/styrene copolymer having a number-average molecular weight of from 10,000 to 150,000 in an amount of from 0.5 to 10% by weight based on the weight of the composition; and
- a metal salt of an alkylbenzenesulfonic acid in amount of from 1 to 30% by weight based on the weight of the composition.

2. The purging thermoplastic resin composition according to claim 1, wherein the alkyl group in the metal salt of an alkylbenzenesulfonic acid has from 6 to 20 carbon atoms and the metal salt is a salt of sodium, calcium, magnesium or potassium.

* * * * *